United States Patent [19]

Ono et al.

[11] Patent Number: 4,943,725
[45] Date of Patent: Jul. 24, 1990

[54] RADIATION IMAGE READ-OUT APPARATUS

[75] Inventors: Shuji Ono; Tsutomu Kimura, both of Kanagawa, Japan

[73] Assignee: Fuji Photo Film Co., Ltd., Kanagawa, Japan

[21] Appl. No.: 259,084

[22] Filed: Oct. 17, 1988

[30] Foreign Application Priority Data

Oct. 16, 1987 [JP] Japan .................. 62-261040

[51] Int. Cl.$^5$ .............................................. G03G 5/16
[52] U.S. Cl. .............................. 250/327.2; 250/484.1
[58] Field of Search .......................... 250/327.2, 484.1

[56] References Cited

U.S. PATENT DOCUMENTS 4,258,264 3/1987 Kotera et al. ................. 250/484.1

FOREIGN PATENT DOCUMENTS 1252436 10/1967 Fed. Rep. of Germany ... 250/474.1

*Primary Examiner*—Carolyn E. Fields
*Assistant Examiner*—David P. Porta
*Attorney, Agent, or Firm*—Sughrue, Mion, Zinn, Macpeak & Seas

[57] ABSTRACT

A radiation image read-out apparatus comprises a microchannel spacial light modulator having a front surface closely contacted with a stimulable phosphor sheet carrying a radiation image stored thereon, and a stimulating ray source for irradiating nearly uniform stimulating rays simultaneously to the overall surface of the stimulable phosphor sheet from the side opposite to the microchannel spacial light modulator with respect to the stimulable phosphor sheet. A reading light source irradiates nearly uniform reading light simultaneously to the overall rear surface of the microchannel spacial light modulator after light emitted by the stimulable phosphor sheet upon exposure to stimulating rays has been detected by the microchannel spacial light modulator. A two-dimensional photodetector detects the reading light reflected and subjected to spacial modulation in accordance with the radiation image by the microchannel spacial light modulator.

5 Claims, 2 Drawing Sheets

RADIATION IMAGE READ-OUT APPARATUS

BACKGROUND OF THE INVENTION

1. Field of the Invention

This invention relates to a radiation image read-out apparatus for reading out a radiation image stored on a stimulable phosphor sheet by exposing the stimulable phosphor sheet to stimulating rays which cause the stimulable phosphor sheet to emit light in proportion to the stored radiation energy, and photoelectrically detecting the emitted light.

2. Description of the Prior Art

When certain kinds of phosphors are exposed to a radiation such as X-rays, α-rays, β-rays, γ-rays, cathode rays, or ultraviolet rays; they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and then is scanned by stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a wide range in proportion to the amount of the stored energy, it is possible to obtain an image having desirable density regardless of the amount of exposure of the stimulable phosphor sheet to the radiation, by reading out the emitted light with an appropriate read-out gain and converting it into electric signals to reproduce a visible image on a recording medium or a display device.

In the aforesaid radiation image recording and reproducing system, the radiation image read-out is performed generally by use of a read-out apparatus for conveying the stimulable phosphor sheet in a sub-scanning direction, and scanning stimulating rays in a main scanning direction approximately normal to the sub-scanning direction.

In the read-out apparatus wherein the light emitted by the stimulable phosphor sheet in proportion to the stored radiation energy is detected by carrying out the sub-scanning and the main scanning, in order to detect the emitted light such that no image nonuniformity arises, it is necessary to provide a conveyance means for accurately conveying the stimulable phosphor sheet in the sub-scanning direction and a complicated optical system for accurately carrying out the main scanning. As the sub-scanning and main scanning are necessary, the conventional read-out apparatus is large-scaled, the mechanism of the apparatus is complicated, and therefore the cost of the apparatus becomes high.

On the other hand, the aforesaid radiation image recording and reproducing system may be used also for obtaining a radiation image of a small object for non-destructive inspection, dentistry, or the like. In this case, a small stimulable phosphor sheet is utilized, and it is desired that the image read-out be carried out without a large-scale read-out apparatus having a complicated mechanism being used as in the conventional technique.

SUMMARY OF THE INVENTION

The primary object of the present invention is to provide a radiation image read-out apparatus which is made small and inexpensive by the elimination of mechanical sub-scanning and main scanning in a system using a small stimulable phosphor sheet.

Another object of the present invention is to provide a radiation image read-out apparatus which quickly carries out image read-out and provides image signals with a high signal-to-noise (S/N) ratio.

The present invention provides a radiation image read-out apparatus comprising:

(i) a microchannel spacial light modulator provided so that a stimulable phosphor sheet carrying a radiation image stored thereon closely contacts a front surface of said microchannel spacial light modulator, (ii) a stimulating ray source for irradiating approximately uniform stimulating rays simultaneously to the overall surface of said stimulable phosphor sheet from the side opposite to said microchannel spacial light modulator with said stimulable phosphor sheet, which is closely contacted with the front surface of said microchannel spacial light modulator, intervening between said stimulating ray source and said microchannel spacial light modulator, (iii) a reading light source for irradiating approximately uniform reading light simultaneously to the overall area of a rear surface of said microchannel spacial light modulator after said stimulating rays produced by said stimulating ray source have been irradiated to said stimulable phosphor sheet to cause said stimulable phosphor sheet to emit light in proportion to the stored radiation energy and the light emitted by said stimulable phosphor sheet has been detected by said microchannel spacial light modulator, and (iv) a two-dimensional photodetector for detecting said reading light produced by said reading light source, irradiated to the rear surface of said microchannel spacial light modulator, and reflected and subjected to spacial modulation in accordance with said radiation image by said microchannel spacial light modulator.

The microchannel spacial light modulator (hereinafter abbreviated to MSPL) was developed by Massachusetts Institute of Technology, Department of Electrical Engineering and Computer Science, and is known as a modulator having high sensitivity and amplification effects, and which is and capable of converting a two-dimensional distribution of light intensity into a two-dimensional distribution of light reflectivity.

In the case where a small stimulable phosphor sheet for dentistry or the like having a size corresponding to the size of the MSPL and carrying a radiation image stored thereon is closely contacted with the front surface of the MSPL and exposed to stimulating rays produced by the stimulating ray source, light is emitted by the stimulable phosphor sheet in proportion to the stored radiation energy upon exposure to stimulating rays and is irradiated to the MSPL. The MSPL transmits the radiation image which the emitted light carries to the rear side of the MSPL, and converts the radiation image into a two-dimensional distribution of light refractive indices. The reading light is then, irradiated by the reading light source to the rear side of the MSPL, and the reading light reflected and modulated in accordance with the distribution of light refractive indices is received by the two-dimensional photodetector such as a two-dimensional charge-coupled device (two-dimensional CCD). In this manner, the radiation image stored on the stimulable phosphor sheet can be read out without mechanical sub-scanning and main scanning being carried out. Also, in the case where the light emitted by the stimulable phosphor sheet is received directly by the two-dimensional CCD or the like, image signals with a substantially high S/N ratio cannot be obtained as the light emitted by the stimulable phosphor sheet is very weak. However, with the radiation image read out apparatus wherein the MSPL having the amplification effects is provided between the stimulable phosphor sheet and the two-dimensional photodetector, the weak light emitted by the stimulable phosphor sheet is converted to the reflected light having a substantially high intensity, and the reflected light is received by the two-dimensional photodetector. Therefore, image signals having a substantially high S/N ratio can be obtained.

As mentioned above, with the radiation image read-out apparatus wherein the radiation image which the light emitted by the stimulable phosphor sheet carries is amplified by use of the MSPL, the reading light then is irradiated to the MSPL, and the reflected light carrying the radiation image is detected by the two-dimensional photodetector, image signals having a substantially high S/N ratio can be obtained without mechanical scanning being carried out, and the read-out apparatus can be made small and inexpensive. Also, by virtue of the elimination of mechanical scanning, the read-out time for obtaining the image signals can be shortened as compared with the conventional read-out apparatus wherein image signals are obtained by carrying out mechanical scanning.

DESCRIPTION OF THE PREFERRED EMBODIMENTS

The present invention will be described hereinbelow in further detail with reference to the accompanying drawings.

The configuration of an MSPL first will be described hereinbelow with reference to FIG. 2.

Figure 2:
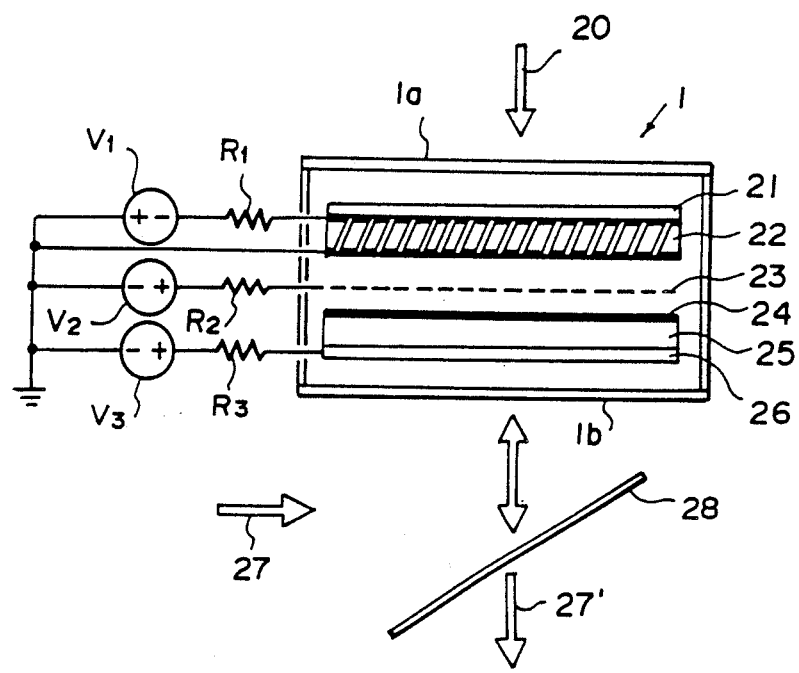
FIG. 2 is a schematic view showing the configuration of the MSPL.

With reference to FIG. 2, power sources V1, V2, and V3 and resistors R1, R2, and R3 are connected as shown. When light 20 carrying an image as a two-dimensional distribution of light intensity passes through a transparent member at a front surface 1a of a MSPL 1 and is irradiated to a photocathode 21, charges in an amount corresponding to the intensity of the irradiated light 20 are generated in a two-dimensional distribution by the photocathode 21. The charges are amplified by a microchannel plate 22, and stored in a dielectric mirror 24 via a grid 23. At the time the charges are thus stored in the dielectric mirror 24, two-dimensional changes in the refractive index arise in an electro-optic crystal 25 closely contacted with the dielectric mirror 24 in accordance with the amount of the stored charges. Thereafter, reading light 27 which may be a laser beam or the like is reflected by a semi-transparent mirror 28, passes through a transparent rear surface 1b of the MSPL 1 and then through a transparent electrode 26, and is irradiated to the electro-optic crystal 25. As a result, the reading light 27 is two-dimensionally modulated in accordance with the aforesaid changes in the refractive index, and is radiated as reflected light 27' out of the electro-optic crystal 25. The reflected light 27' thus radiated out carries the aforesaid image, and image signals can be obtained by detecting the reflected light 27' by an appropriate means.

Figure 1:
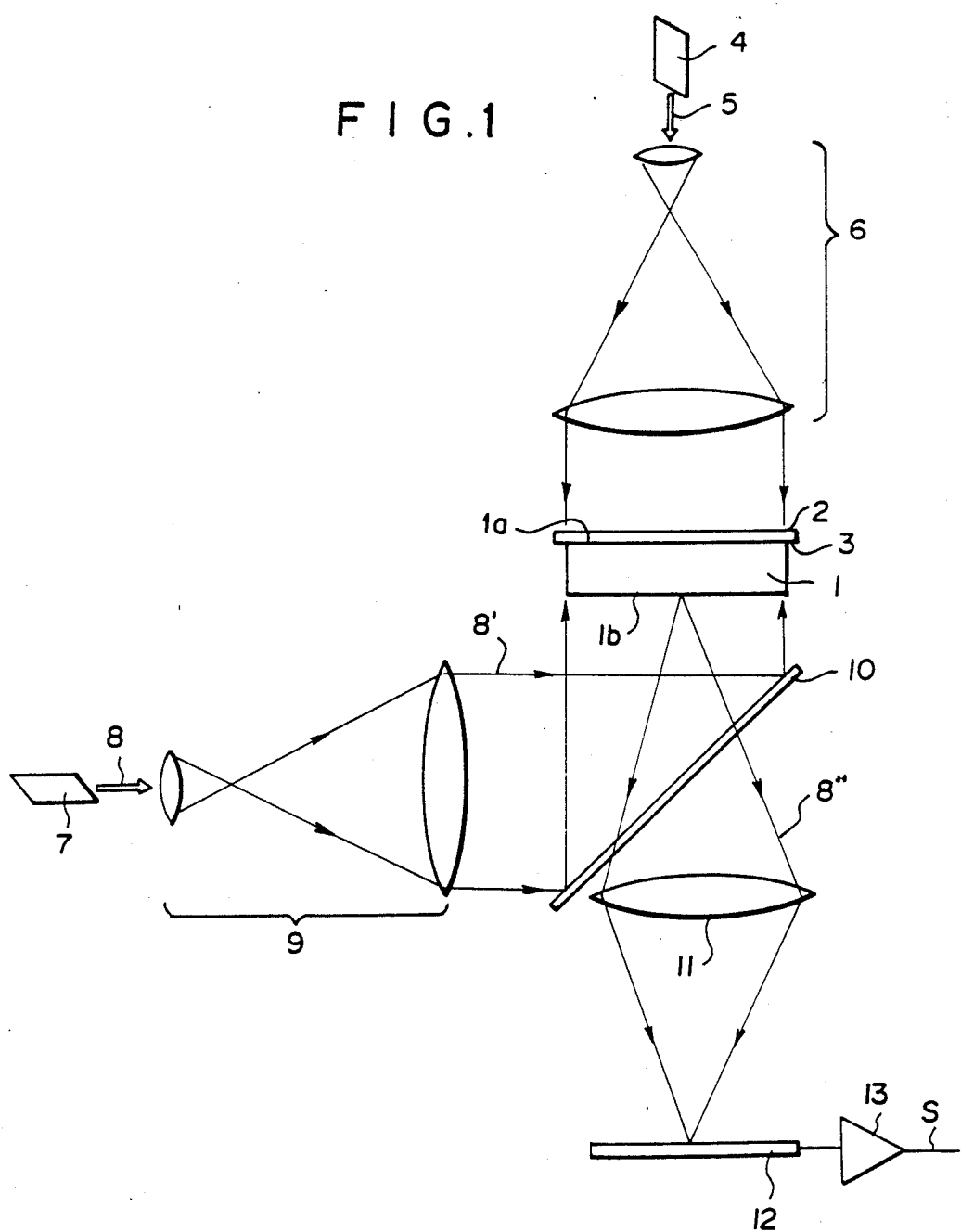
FIG. 1 is a schematic view showing an embodiment of the radiation image read-out apparatus in accordance with the present invention.

FIG. 1 shows an embodiment of the radiation image read-out apparatus in accordance with the present invention wherein the MSPL is utilized.

With reference to FIG. 1, a stimulable phosphor sheet 2 carrying a radiation image stored thereon is closely contacted with the front surface 1a of the MSPL 1 via an optical filter 3 for selectively transmitting light emitted by the stimulable phosphor sheet 2 in proportion to the stored radiation energy. By way of example, the stimulable phosphor sheet 2 is a small stimulable phosphor sheet for use in dentistry. A stimulating ray source 4 which may be a laser beam source or the like, and an optical system 6 for diverging stimulating rays 5 produced by the stimulating ray source 4 so that the stimulating rays 5 are nearly uniformly irradiated to the overall surface of the stimulable phosphor sheet 2 simultaneously are provided on the side opposite to the MSPL 1 with the stimulable phosphor sheet 2, which is closely contacted with the MSPL 1, intervening between the stimulating ray source 4 and the optical system 6 and alternatively the MSPL. A reading light source 7 which may be a laser beam source or the like, an optical system 9 for diverging reading light 8 produced by the reading light source 7 so that the reading light 7 is irradiated nearly uniformly to the overall area of a rear surface 1b of the MSPL 1 simultaneously, and a semi-transparent mirror 10 for reflecting reading light 8', which has passed through the optical system 9, toward the rear surface 1b of the MSPL 1 are provided on the side of the rear surface 1b of the MSPL 1. Also, a two-dimensional photodetector 12 constituted by a two-dimensional CCD or the like for receiving the light reflected by the MSPL 1 and carrying the radiation image via an optical system 11 for scaling the reflected light, and an attendant circuit 13 for reading out the image signals from the two-dimensional photodetector 12 are provided on the side of the rear surface 1b of the MSPL 1.

Operations of the radiation image read-out apparatus constituted in the manner as mentioned above will be described hereinbelow.

The stimulable phosphor sheet 2 carrying the radiation image stored thereon is closely contacted with the front surface 1a of the MSPL 1 with the optical filter 3 intervening between the stimulable phosphor sheet 2 and the front surface 1a of the MSPL 1. Thereafter, the stimulating rays 5 are produced by the stimulating ray source 4 and nearly uniformly irradiated onto the overall surface of the stimulable phosphor sheet 2 simultaneously. As the stimulable phosphor sheet 2 is exposed to the stimulating rays 5, the stimulable phosphor sheet 2 emits light carrying the radiation image, and the emitted light passes through the optical filter 3 and is irradiated to the MSPL 1. Upon exposure to the light emitted by the stimulable phosphor sheet 2, the MSPL 1 generates a refractive index distribution in accordance with the two-dimensional distribution of the amounts of the emitted light as mentioned above. Thereafter, the reading light 8 produced by the reading light source 7 is irradiated nearly uniformly onto the overall area of the rear surface 1b of the MSPL 1 simultaneously via the optical system 9 and the semi-transparent mirror 10. The reading light 8' thus irradiated onto the rear surface 1b of the MSPL 1 is reflected and modulated two-dimensionally in accordance with the refractive index distribution, and the reflected light 8" thus modulated is irradiated onto the two-dimensional photodetector 12 via the semi-transparent mirror 10 and the optical system 11. The reflected light 8" directly carries the radiation image which the light emitted by the stimulable phosphor sheet 2 carried. The reflected light 8" carrying the radiation image and irradiated onto the two-dimensional photodetector 12 is converted photoelectrically by the two-dimensional photodetector 12 and is detected as image signals S by the attendant circuit 13. The image signals S thus detected are sent to a storage means (not shown) for storing the image signals S, a reproduction means (not shown) for reproducing the radiation image as a visible image, and the like.

We claim:

1. A radiation image read-out apparatus, comprising:
   (i) a microchannel spacial light modulator positioned such that a stimulable phosphor sheet carrying a radiation image stored thereon is less than a predetermined distance from a front surface of said microchannel spacial light modulator,
   (ii) a stimulating ray source comprising means for irradiating approximately uniform stimulating rays simultaneously to the overall surface of said stimulable phosphor sheet from the side opposite to said microchannel spacial light modulator with said stimulable phosphor sheet intervening between said stimulating ray source and said microchannel spacial light modulator,
   (iii) a reading light source comprising means for irradiating approximately uniform reading light simultaneously to the overall area of a rear surface of said microchannel spacial light modulator after said stimulating rays produced by said stimulating ray source have been irradiated to said stimulable phosphor sheet to cause said stimulable phosphor sheet to emit light in proportion to the stored radiation energy and the light emitted by said stimulable phosphor sheet has been detected by said microchannel spacial light modulator, and
   (iv) a two-dimensional photodetector comprising means for detecting said reading light produced by said reading light source, irradiated to the rear surface of said microchannel spacial light modulator, and reflected and subjected to spacial modulation in accordance with said radiation image by said microchannel spacial light modulator.

2. An apparatus as defined in claim 1, wherein an optical filter is disposed between said stimulable phosphor sheet and said microchannel spacial light modulator for selectively transmitting the light emitted by said stimulable phosphor sheet intervening between said stimulable phosphor sheet and the front surface of said microchannel spacial light modulator.

3. An apparatus as defined in claim 1, wherein said stimulating rays are a laser beam.

4. An apparatus as defined in claim 1, wherein said reading light is a laser beam.

5. An apparatus as defined in claim 1, wherein said microchannel spacial light modulator is positioned such that it is closely contacted with said stimulable phosphor sheet.

* * * * *